United States Patent [19]

Iio et al.

[11] Patent Number: 5,907,483
[45] Date of Patent: May 25, 1999

[54] CONTROL SYSTEM FOR POWER CONVERSION SYSTEM

[75] Inventors: Naotaka Iio, Saitama-ken; Hajime Yamamoto, Kanagawa-ken, both of Japan

[73] Assignee: Kabushiki Kaisha Toshiba, Kawasaki, Japan

[21] Appl. No.: 09/069,142

[22] Filed: Apr. 29, 1998

[51] Int. Cl.⁶ .......................... H02H 7/122; H02H 7/00; H02M 3/24; H02M 7/5387
[52] U.S. Cl. ................................ 363/58; 363/51; 363/98; 363/132
[58] Field of Search ................................. 363/51, 55, 56, 363/58, 98, 132

[56] References Cited

U.S. PATENT DOCUMENTS

| | | | |
|---|---|---|---|
| 4,641,075 | 2/1987 | Asano et al. | 363/42 |
| 4,958,117 | 9/1990 | Kerkman et al. | 318/805 |
| 5,057,989 | 10/1991 | Hirose et al. | 363/95 |
| 5,461,300 | 10/1995 | Kappenman | 323/215 |
| 5,650,708 | 7/1997 | Sawada et al. | 318/801 |
| 5,715,151 | 2/1998 | Moriura | 363/54 |
| 5,854,743 | 12/1998 | Yamamoto | 363/71 |

FOREIGN PATENT DOCUMENTS

6-284731 10/1994 Japan .

*Primary Examiner*—Peter S. Wong
*Assistant Examiner*—Bao Q. Vu
*Attorney, Agent, or Firm*—Oblon, Spivak, McClelland, Maier &Neustadt, P.C.

[57] ABSTRACT

A control system for a power conversion system, composed of at least one voltage source type converter and a transformer. The control system includes, a circuit for detecting line-to-line voltages of an AC power source, an instantaneous phase detecting circuit for detecting instantaneously a phase angle of a phase voltage of the AC power source based on the line-to-line voltages of the AC power source, a circuit for detecting AC currents outputted from the power conversion system, a first coordinate transformation circuit for converting AC currents into an active current detected value and a reactive current detected value in a coordinate determined by a phase voltage vector of the AC power source using the phase angle, a current control circuit for generating output signals based on a current control result, a second coordinate transformation circuit for converting the output signals of the current control circuit into two-phase signals in a static coordinate system using the phase angle, a pulse width modulation control circuit for generating pulse width modulated signals, based on a pulse width modulation control result, and a circuit for generating gate pulses based on the pulse width modulated signals.

3 Claims, 12 Drawing Sheets

CONTROL SYSTEM FOR POWER CONVERSION SYSTEM

BACKGROUND OF THE INVENTION

1. Field of the Invention

This invention relates to a control system for a power conversion system, and more particularly to a control system for a power conversion system composed of voltage source type power converters which can continue its operation without generating overcurrents when the voltage waveform of an AC power source is distorted greatly due to a fault in the AC power source system.

2. Description of the Related Art

Hereinafter, in the drawings, like reference numerals designate identical or corresponding parts throughout the several views, but it is noticed that a part with a reference numeral not in parentheses is different from a part with the same reference numeral in parentheses.

Figure 8:
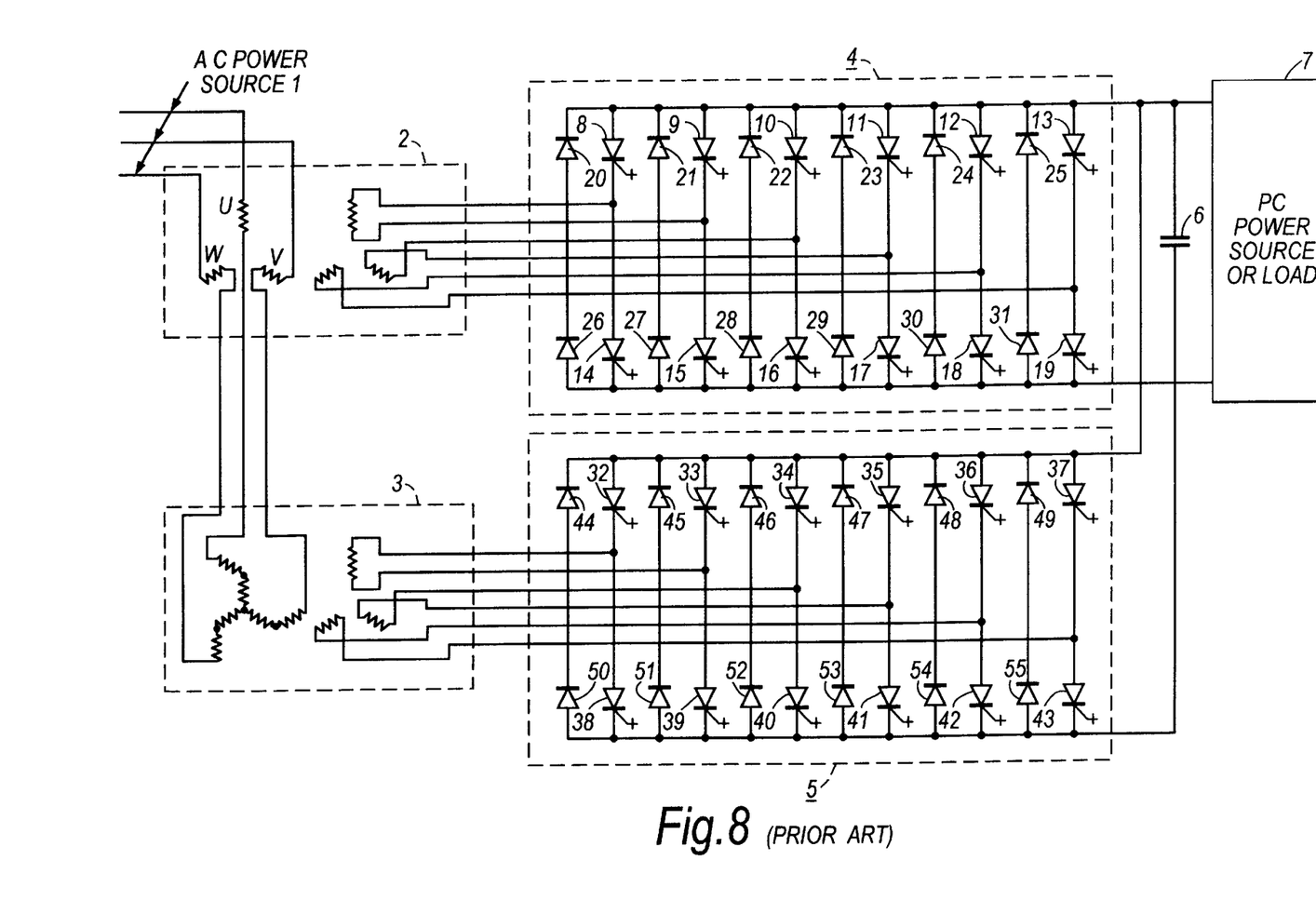
FIG. 8 is a block diagram showing the construction of a main circuit of a power conversion system to which this invention is applied.

FIG. 8 is a block diagram showing the construction of a conventional main circuit of a power conversion system. In FIG. 8, 1 is an AC power source, 2 is a first transformer, 3 is a second transformer, 4 is a first converter, 5 is a second converter, 6 is a capacitor, and 7 is a DC power source or a load. 8–19 are self-turn-off devices, such as, gate turn-off thyristors (hereinafter, referred to simply as GTO) composing first converter 4, 20–31 are diodes respectively connected in anti-parallel with GTOs 8–19, 32–43 are self-turn-off devices, such as, GTOs composing second converter 5, and 44–55 are diodes respectively connected in anti-parallel with GTOs 32–43.

Figure 9:
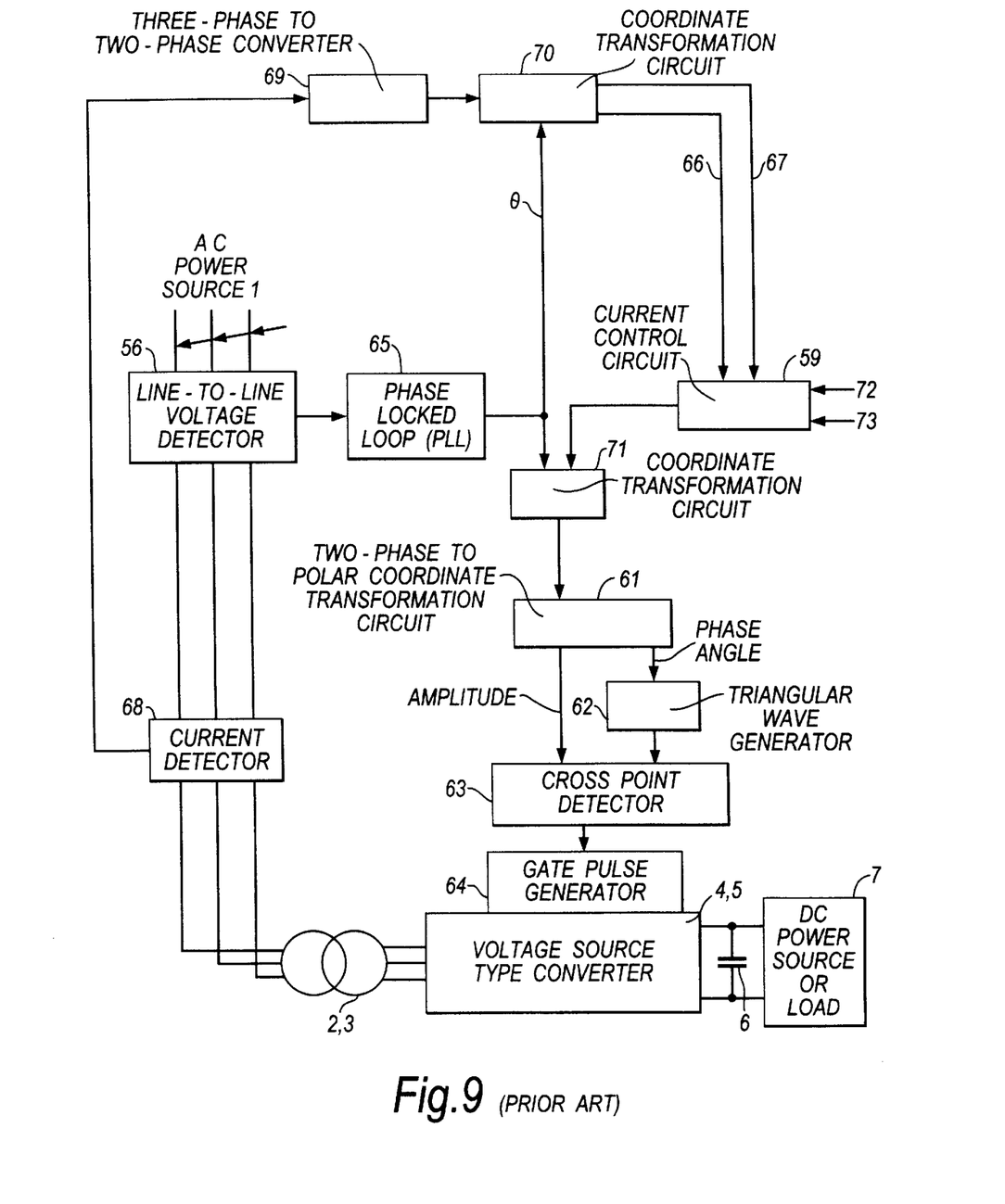
FIG. 9 is a block diagram showing the construction of a conventional control system for a power conversion system; according to a second embodiment of this invention.

FIG. 9 is a block diagram showing the construction of a conventional control system for the power conversion system shown in FIG. 8. In FIG. 9, 1 corresponds to AC power source 1 in FIG. 8, 4,5 is a voltage source type power converter corresponding to converters 4 and 5 in FIG. 8, and 2,3 is a transformer corresponding to transformers 2 and 3 in FIG. 8. Furthermore, 6 and 7 correspond respectively to capacitor 6 and DC power source or load 7 in FIG. 8.

Further, 56 is a line-to-line voltage detector for detecting three line-to-line voltages of three-phase AC power source 1, and 65 is a phase locked loop (PLL) which generates a voltage phase value θ of AC power source 1, obtained by removing the distortion included in the voltage waveform of AC power source 1. 59 is a current control circuit for controlling output currents of converter 4,5. The output currents of converter 4,5 are detected by a current detector 68 and the detected three-phase currents are converted into two-phase currents by a three-phase to two-phase converter 69. The converted two-phase currents are inputted to a coordinate transformation circuit 70, which converts the two-phase currents into current values on a coordinate having the same phase as that of a voltage vector of AC power source 1 using voltage phase value θ of AC power source 1 computed by phase locked loop 65. Such current values are composed of an active current detected value 66 and a reactive current detected value 67 and are inputted to current control circuit 59. As current command values for current control circuit 59, an active current command value 72 and a reactive current command value 73 are inputted to current control circuit 59. 71 is a coordinate transformation circuit which converts output signals of current control circuit 59 into two-phase signals on a static coordinate system using voltage phase value θ computed by phase locked loop 65. The converted two-phase signals are inputted to a two-phase to polar coordinate transformation circuit 61 which computes an amplitude and a phase angle from the two-phase signals. The computed phase angle is inputted to a triangular wave generator 62 which generates triangular wave signals corresponding to the computed phase angle of 0° to 360°. The computed amplitude is inputted to a cross point detector 63 which detects cross points of the computed amplitude and the triangular wave signals and generates pulse width modulated signals for turning ON or OFF the GTOs in converter 4,5. The pulse width modulated signals are inputted to a gate pulse generator 64 which generates gate pulses for actually turning ON or OFF the GTOs in converter 4,5 based on the pulse width modulated signals. Here, two-phase to polar coordinate transformation circuit 61, triangular wave generator 62 and cross point detector 63 compose a pulse width modulation control means.

Figure 10:
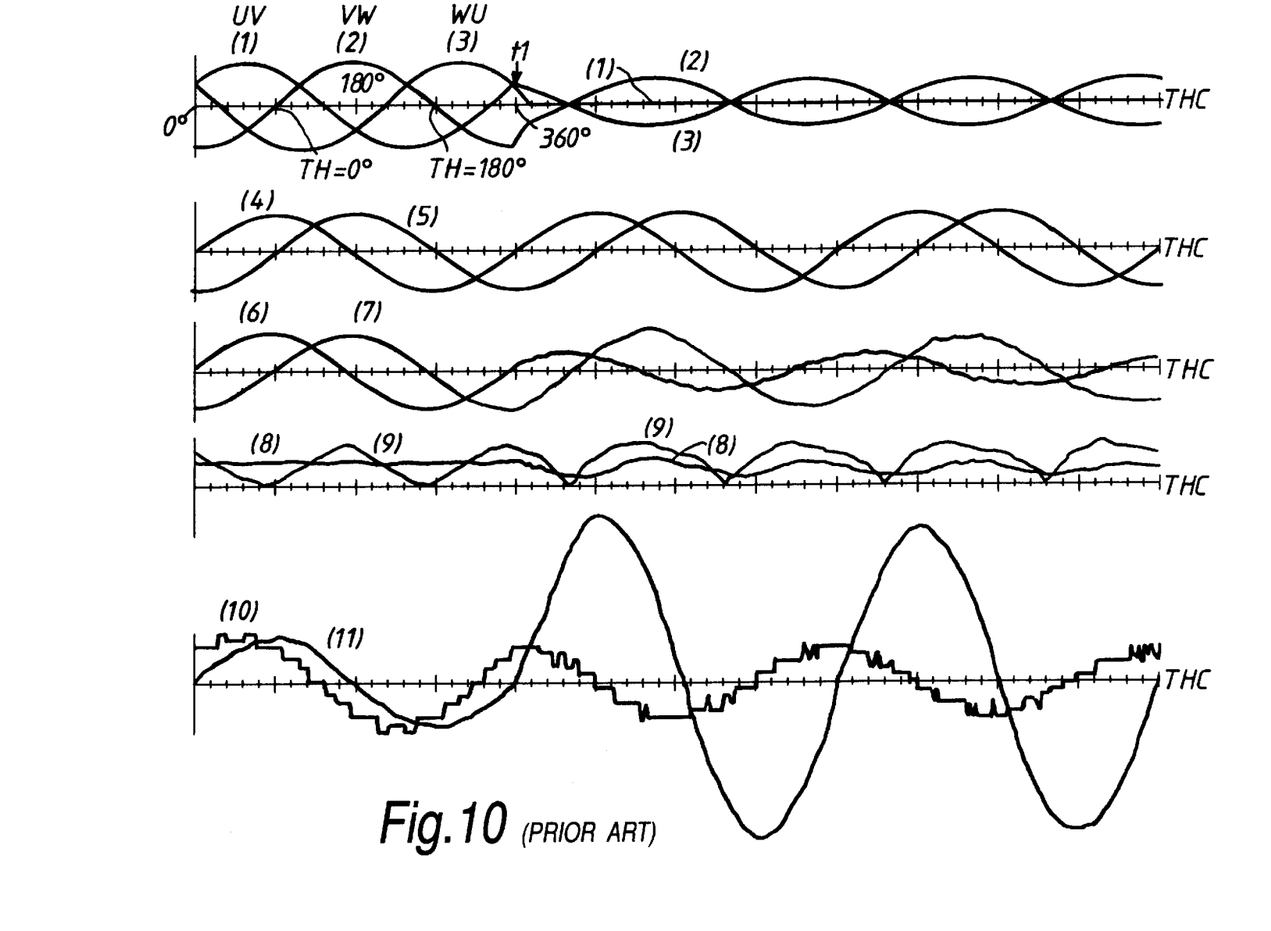
FIG. 10 is a waveform diagram for explaining the operation of the control system shown in FIG. 9.
Figure 11:
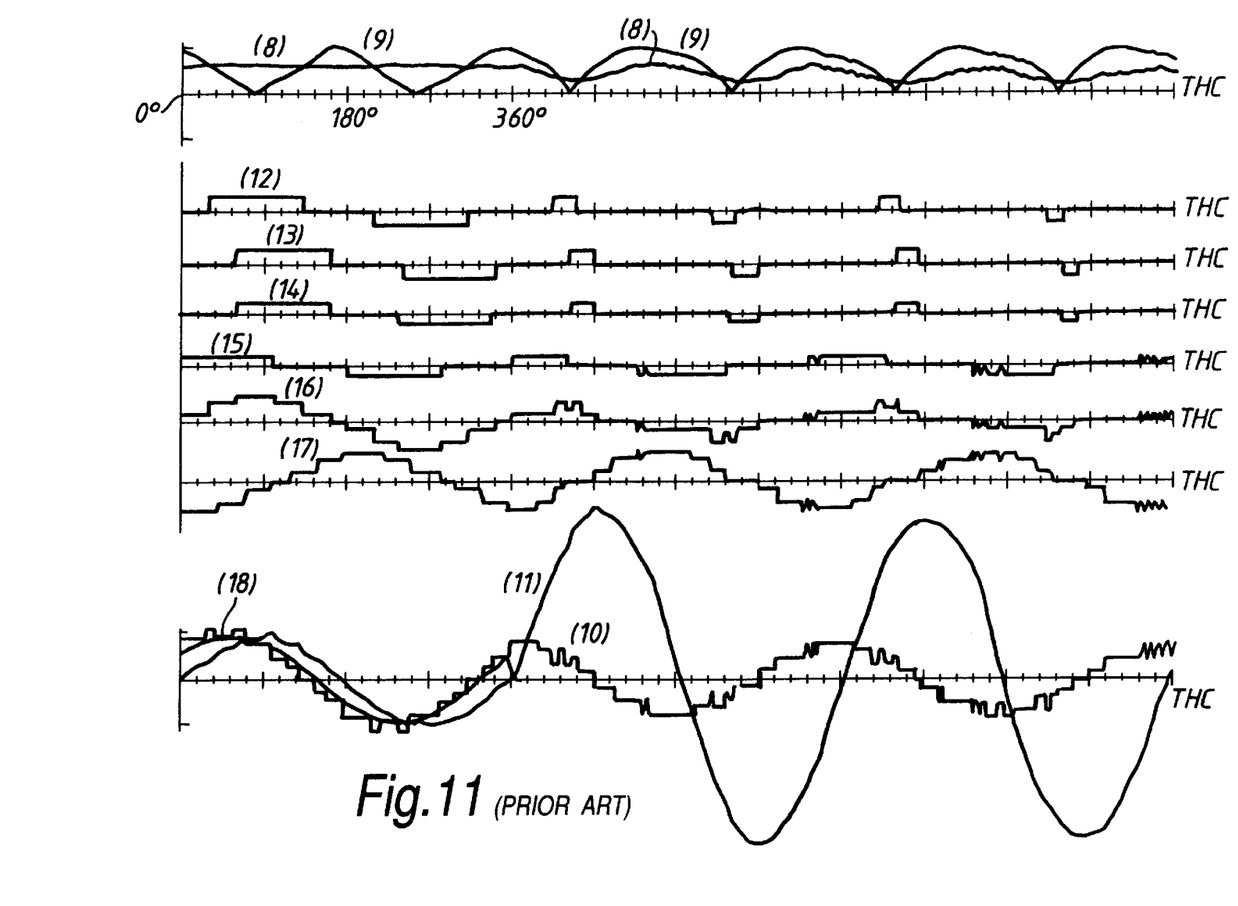
FIG. 11 is a waveform diagram for explaining the operation of the control system shown in FIG. 9.
Figure 12:
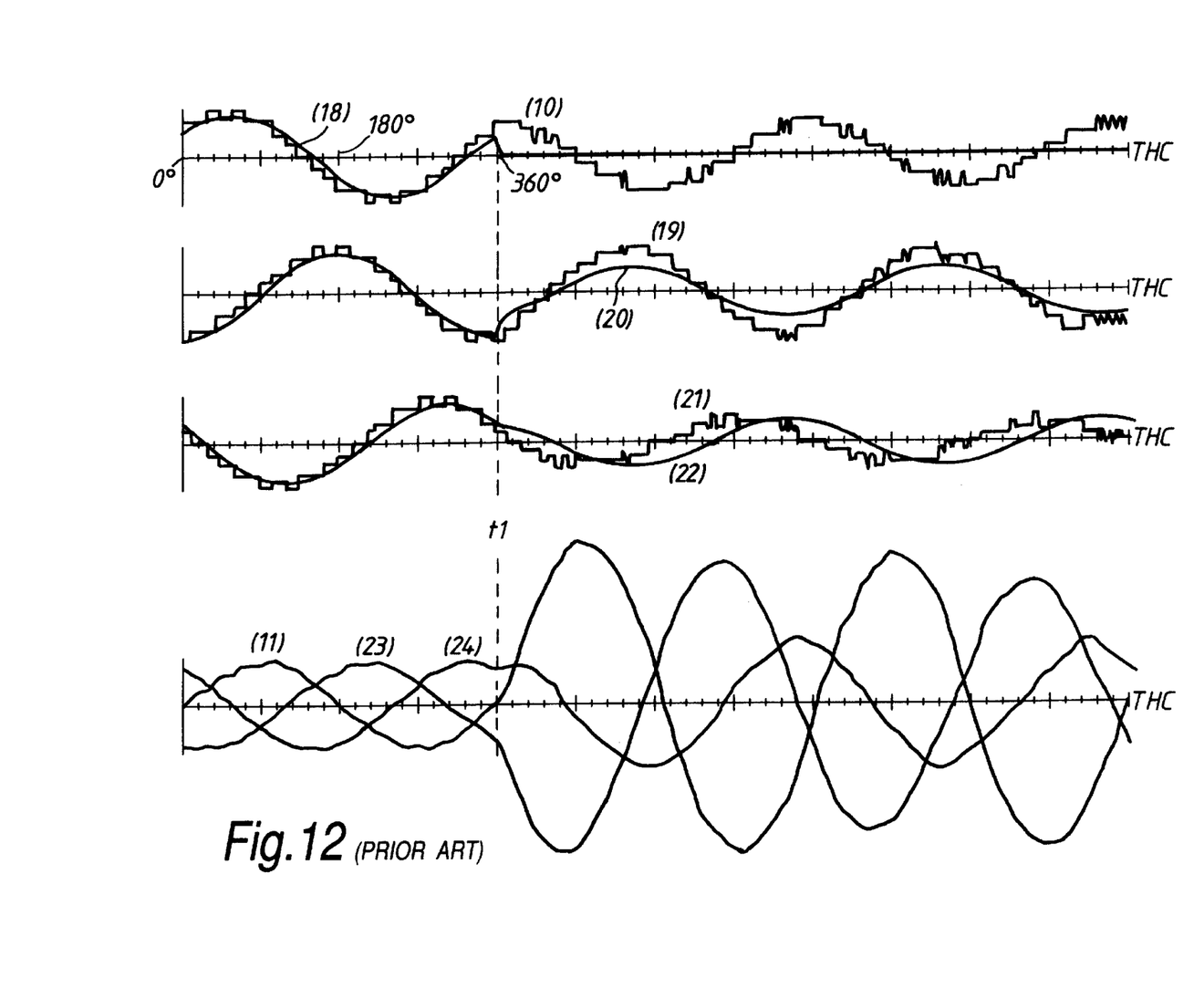
FIG. 12 is a waveform diagram for explaining the operation of the control system shown in FIG. 9.

FIGS. 10 to 12 are waveform diagrams for explaining the operation of the conventional control system shown in FIG. 9. Hereinafter, the operation of the conventional control system shown in FIG. 9 is described with reference to FIGS. 10 to 12.

FIG. 10 shows waveforms of the voltage detected values of AC power source 1 through the outputs of two-phase to polar coordinate transformation circuit 61 and triangular wave generator 62. In FIG. 10, (1) is a UV-phase line-to-line voltage of AC power source 1, (2) is a VW-phase line-to-line voltage of AC power source 1, and (3) is a WU-phase line-to-line voltage of AC power source 1. It is assumed that at a time t1 two lines of the U-phase and V-phase are grounded and thereby a U-phase voltage and a V-phase voltage become zero. After time t1, UV-phase line-to-line voltage (1) becomes zero, and VW-phase line-to-line voltage (2) and WU-phase line-to-line (3) become the voltages whose amplitudes are $1/\sqrt{3}$ times those before time t1, respectively. (4) and (5) are two-phase AC voltage signals converted from three-phase line-to-line voltages of AC power source 1 and are used in phase locked loop 65 for detecting voltage phase angle θ. As phase locked loop 65 is provided with a filter having a considerably long time constant enough to eliminate the distortion included in the detected AC voltages, two-phase AC voltage signals (4) and (5) do not change practically their waveforms after time t1. (6) and (7) are output signals of current control circuit 59. (8) is an amplitude signal of two-phase to polar coordinate transformation circuit 61. (9) is one of triangular wave signals outputted from triangular wave generator 62 obtained by converting the phase angle signal from two-phase to polar coordinate transformation circuit 61 into triangular waves (10) is a UV-phase voltage of converter 4,5 and (11) is a U-phase current of AC power source 1. These are explained later in detail with reference to FIG. 11

Next, with reference to FIG. 11, the operation of the control system shown in FIG. 9 is described from two-phase to polar coordinate transformation circuit 61 and triangular wave generator 62 through converter 4,5. In FIG. 11, in cross point detector 63, output signal (9) of triangular wave generator 62 is compared with amplitude output signal (8) of two-phase to polar coordinate transformation circuit 61. While the phase angle is in the range of 0°–180°, when signal (8) is larger than signal (9), GTO 8 and GTO 15 in converter 4 are in the ON state and a positive DC voltage is applied to a secondary U-phase winding of transformer 2. When it is detected that signal (8) becomes smaller than signal (9), GTO 8 is turned OFF and GTO 14 is turned ON, and then the voltage applied to the secondary U-phase winding of transformer 2 becomes zero Next, while the phase angle is in the range of 180°–360°, when signal (8) becomes larger than signal (9) GTO 15 is turned OFF and GTO 9 is turned ON, and thereby a negative DC voltage is applied to the secondary U-phase winding of transformer 2. When it is detected that signal (8) becomes smaller than signal (9), GTO 14 is turned OFF and GTO 8 is turned ON, and then the voltage applied to the secondary U-phase winding of transformer 2 becomes zero. Then, GTOs 8, 9, 14 and 15 are ON-OFF controlled the same as described above, the waveform of the voltage at the secondary U-phase winding of transformer 2 becomes as shown in (12). (13) is a U-phase output voltage of converter 5 and is applied to a secondary U-phase winding of transformer 3. U-phase output voltage (13) of converter 5 is obtained, similarly as described above, by turning OK and OFF GTOs 32, 33, 38 and 39 in converter 5 based on the comparison result of a triangular wave snot shown) lagged of the phase angle from triangular wave (9) by 30° which is generated from triangular generator 62 with amplitude output signal (8).

Here, a primary winding of transformer 3 is of a zigzag connection. That is, a U-phase primary winding is composed of a series connection of a first winding positively coupled to a U-phase secondary winding by a turn ratio of $1/\sqrt{3}$ and a second winding negatively coupled to a V-phase secondary winding by a turn ratio of $1/\sqrt{3}$. (14) is a voltage induced in the first winding, that is, U-phase primary winding positively coupled to U-phase secondary winding in transformer 3, and the amplitude of voltage (14) is $1/\sqrt{3}$ times that of voltage (13). Similarly, (15) is a voltage induced in the second winding, that is, U-phase primary winding negatively coupled to V-phase secondary winding in transformer 3. Accordingly, a voltage induced in U-phase primary winding of transformer 3 is the sum of voltages (14) and (15). In U-phase primary winding of transformer 2, a voltage equal to voltage (12) is induced. Therefore, a sum of voltages induced in U-phase primary windings of transformers 2 and 3 is the sum of voltages (12), (14) and (15) and is shown by a voltage (16). Voltage (16) is a voltage obtained by composing the output voltages of converters 4 and 5 by transformers 2 and 3 and is referred to as a U-phase converter voltage. Similarly, (17) is a V-phase converter voltage. (10) is UV-phase converter voltage which is equal to the difference between U-phase converter voltage (16) and V-phase converter voltage (17). (18) is a UV-phase voltage of AC power source 1. U-phase current (11) flows which is determined by the relation of the difference between UV-phase converter voltage (10) and UV-phase power source voltage (18) (UV-phase line-to-line voltage (1) of AC power source 1) and the impedances of transformers 2 and 3.

FIG. 12 is a waveform diagram showing the relation among voltages of AC power source 1, voltages of converters 4 and 5, and currents flowing in AC power source 1.

In FIG. 12, (18) is UV-phase power source voltage (UV-phase line-to-line voltage (1) of AC power source 1), (20) is a VW-phase power source voltage (VW-phase line-to-line voltage (2) of AC power source 1), and (22) is a WU-phase power source voltage (WU-phase line-to-line voltage (3) of AC power source 1). (10) is UV-phase converter voltage, (19) is a VW-phase converter voltage, and (21) is a WU-phase converter voltage. Further, (11) is U-phase current, (23) is a V-phase current, and (24) is a W-phase current.

If at time t1, two lines of the U-phase and V-phase are grounded, thereby U-phase voltage and V-phase voltage become zero. After time t1, UV-phase power source voltage (18) becomes zero, and VW-phase power source voltage (20) and WU-phase power source voltage (22) become the voltages whose amplitudes are $1/\sqrt{3}$ times those before time t1, respectively. Output voltages (10), (19) and (21) of converters 4 and 5 can not follow the sudden change of these voltages and U-phase current (11), V-phase current (23) and W-phase current (24) become in the overcurrent state, respectively.

As described above, according to the conventional control system for a power conversion system, voltages of AC power source 1 are detected and are supplied to phase locked loop 65, which reduces the distortion included in the voltage waveforms of AC power source 1 and computes a voltage phase based on the AC voltages of less distortion. Converters 4 and 5 are controlled based on this voltage phase computed by phase locked loop 65. Therefore, when a fault, such as a line-to-ground fault, occurs in the AC power source system, it is impossible to detect the voltage phase thereof instantaneously by the affect of the filter with a large time constant included in phase locked loop 65. As a result, it is impossible to suppress the overcurrent caused by the sudden change of the voltages and thereby it is not able to continue the operation of the power conversion system.

SUMMARY OF THE INVENTION

Accordingly, one object of this invention is to provide a control system for a power conversion system which can continue the operation of the power conversion system, even if a fault occurs in an AC power system, without generating overcurrents by detecting instantaneously a phase angle of a phase voltage of the AC power system.

Another object of this invention is to provide a control system for a power conversion system which can suppress harmonics generated from the power conversion system in an unstable system condition, such as in the system condition that the short circuit capacity is small, and thereby can prevent the control due to the change in the detected phase caused by the harmonics.

These and other objects of this invention can be achieved by providing a control system for a power conversion system, composed of at least one voltage source type converter and a transformer, the voltage source type converter composed of a plurality of bridge connected self-turn-off devices for converting DC power into AC power, AC sides of the voltage source type converter connected to secondary windings of the transformer, and primary windings of the transformer adapted for connecting to an AC power source. The control system includes, a circuit for detecting line-to-line voltages of the AC power source, an instantaneous phase detecting circuit for detecting instantaneously a phase angle of a phase voltage of the AC power source based on the line-to-line voltages of the AC power source, a circuit for detecting AC currents outputted from the power conversion system, a first coordinate transformation circuit connected to receive the phase angle and the AC currents for converting the AC currents into an active current detected value and a reactive current detected value in a coordinate determined by a phase voltage vector of the AC power source using the phase angle, a current control circuit connected to receive the active current detected value, the reactive current detective value, an active current command value and a reactive current command value for generating output signals based on a current control result, a second coordinate transformation circuit connected to receive the phase angle and the output signals of the current control circuit for converting the output signals into two-phase signals in a static coordinate system using the phase angle, a pulse width modulation control circuit connected to receive the two-phase signals for generating pulse width modulated signals, based on a pulse width modulation control result, and a circuit for generating gate pulses for turning ON or OFF one of the self-turn-off devices in the voltage source type converter, respectively, based on the pulse width modulated signals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, the embodiments of this invention will be described below.

This invention is applied to such a power conversion system a main circuit of which is shown in FIG. 8.

Figure 1:
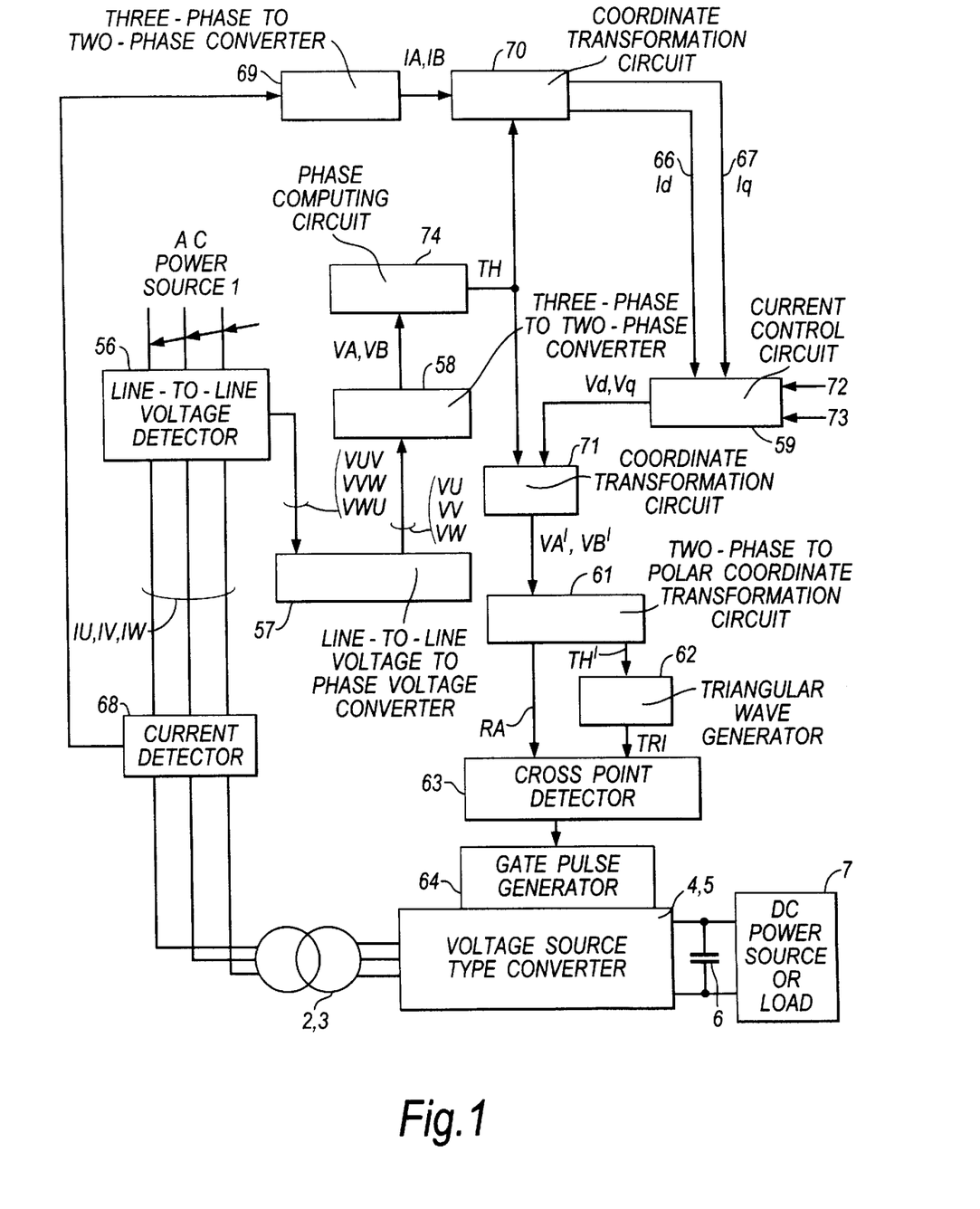
FIG. 1 is a block diagram showing the construction of a control system for a power conversion system according to a first embodiment of this invention.

FIG. 1 is a block diagram showing the construction of a control system for a power conversion system according to a first embodiment of this invention.

In FIG. 1, instead of phase locked loop 65 in FIG. 9, there is provided an instantaneous phase detecting means composed of a line-to-line voltage to phase voltage converter 57, a three-phase to two-phase converter 58 and a phase computing circuit 74. Line-to-line voltage to phase voltage converter 57 converts line-to-line voltages detected by line-to-line voltage detector 56 into phase voltages of the three-phase. Three-phase to two-phase converter 58 converts the three-phase phase voltages outputted from line-to-line voltage to phase voltage converter 57 into two-phase signals. Phase computing circuit 74 computes a phase of a phase voltage of AC power source 1 from the two-phase signals outputted from three-phase to two-phase converter 58. The phase computed in phase computing circuit 74 is applied to coordinate transformation circuits 70 and 71.

The circuit construction from three-phase to two-phase converter 69 and coordinate transformation circuit 70 to gate pulse generator 64 is the same as that shown in FIG. 9.

The operation of the control system as described above is explained below.

Figure 2:
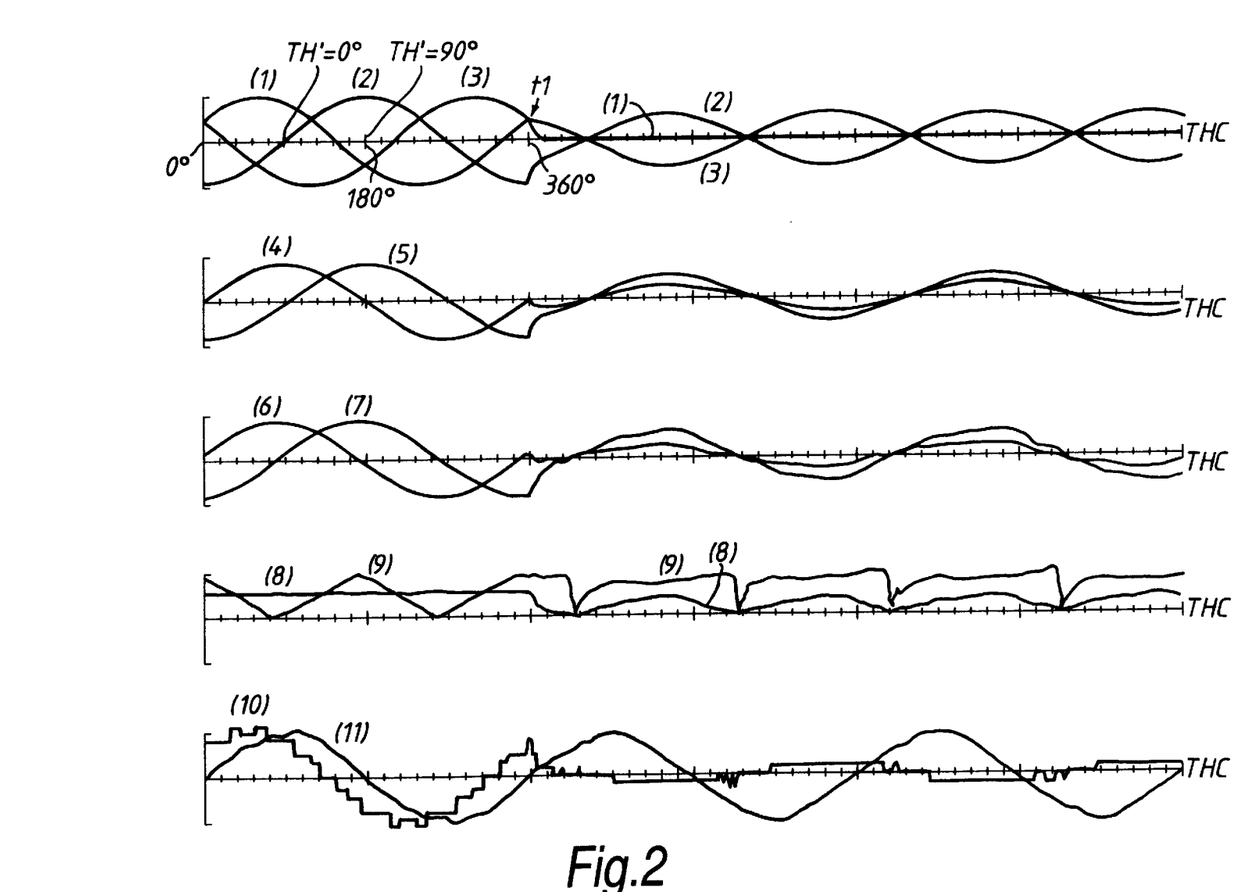
FIG. 2 is a waveform diagram for explaining the operation of the control system shown in FIG. 1.
Figure 3:
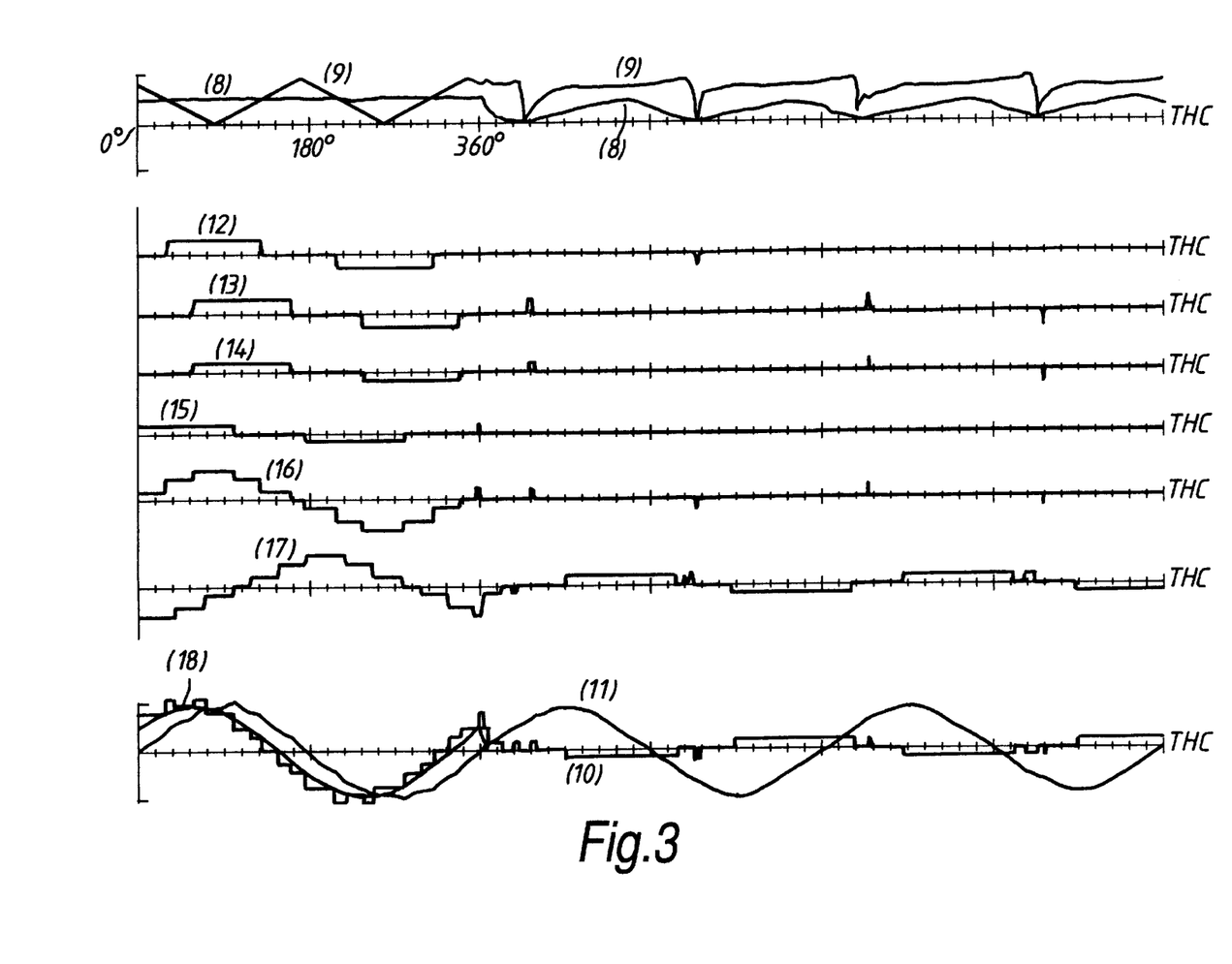
FIG. 3 is a waveform diagram for explaining the operation of the control system shown in FIG. 1.
Figure 4:
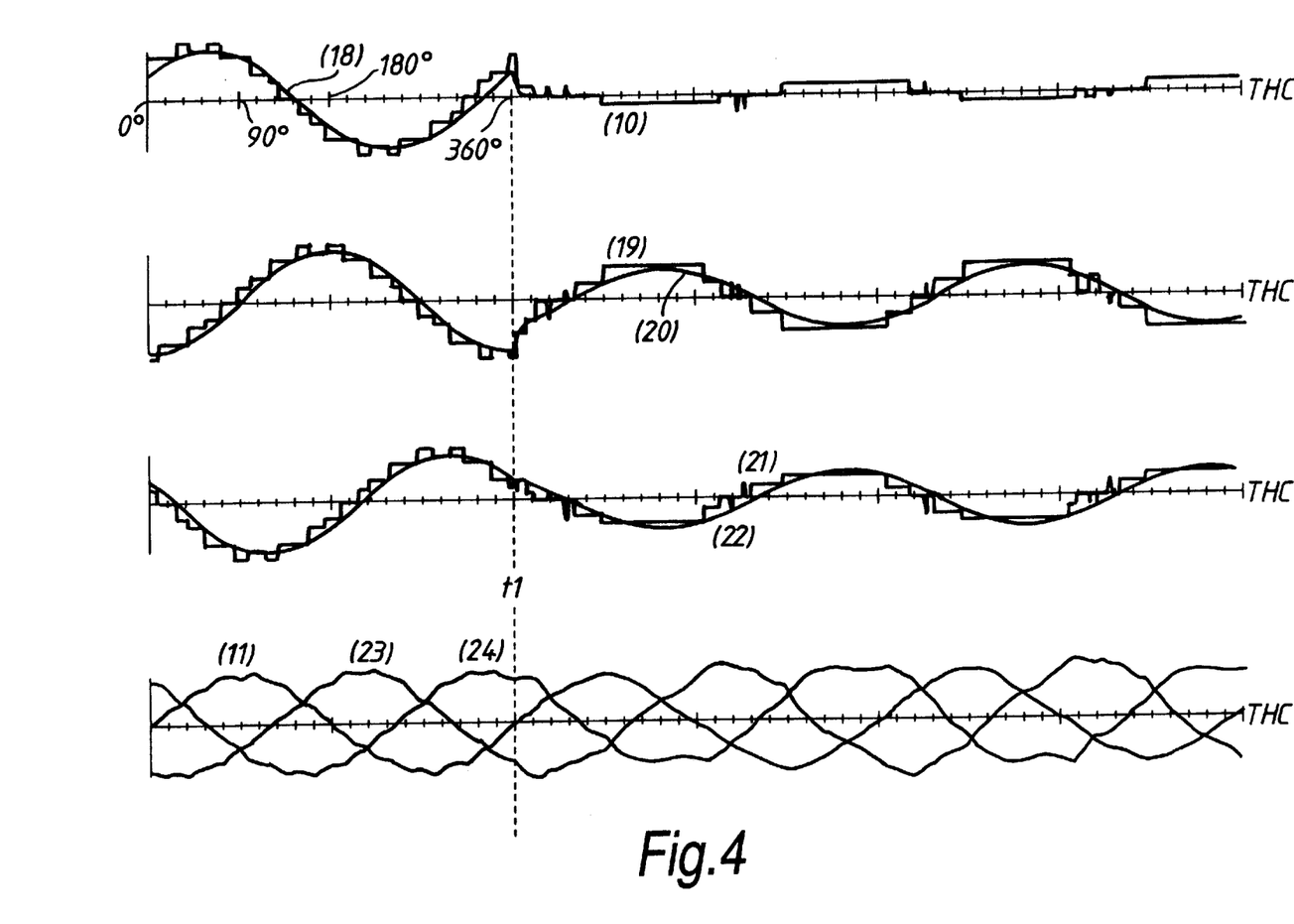
FIG. 4 is a waveform diagram for explaining the operation of the control system shown in FIG. 1.

FIGS. 2 to 4 are waveform diagrams for explaining the operation of the control system shown in FIG. 1.

In FIG. 2, (1) is a UV-phase line-to-line voltage of AC power source 1, (2) is a VW-phase line-to-line voltage of AC power source 1, and (3) is a WU-phase line-to-line voltage of AC power source 1. It is assumed that at time t1, two lines of the U-phase and V-phase are grounded and thereby U-phase voltage and V-phase voltage become zero. After time t1, UV-phase line-to-line voltage (1) becomes zero, and VW-phase line-to-line voltage (2) and WU-phase line-to-line (3) become the voltages whose amplitudes are $1/\sqrt{3}$ times those before time t1, respectively. Line-to-line voltage detector 56 detects UV-phase line-to-line voltage (1) VW-phase line-to-line voltage (2), and WU-phase line-to-line voltage (3) of AC power source 1, and reference numerals VUV, VVW and VWU are assigned to the detected voltages, respectively. Line-to-line voltage to phase voltage converter 57 performs the following equations and outputs phase voltages VU, VV, and VW.

$$VU=(2 \times VUV+VVW)/3$$

$$VV=(2 \times VVW+VWU)/3$$

$$VW=(2 \times VWU+VUV)/3$$

Further, phase voltages VU, VV and VW are converted to two-phase signals VA and VB in an orthogonal AB coordinate in three-phase to two-phase converter 58 according to the following equations. Here, it is assumed that an axis A is taken in the U-phase direction and an axis B is advanced from axis A by 90°.

$$VA=VU-(VV+VW)/2$$

$$VB=(VV-VW) \times \sqrt{3/2}$$

In FIG. 2, (4) and (5) are waveforms of two-phase signals VA and VB outputted from three-phase to two-phase converter 58, respectively. These two-phase signals (4) and (5) are obtained by converting three-phase line-to-line voltages (1), (2) and (3) into the two-phase. Therefore, the distortion included in the voltages of AC power source 1 reappears in waveforms (4) and (5) as it is.

Current detector 68 detects phase currents IU, IV and IW outputted from converter 4,5. Further, phase currents IU, IV and IW are converted to two-phase signals IA and IB in an orthogonal AB coordinate in three-phase to two-phase converter 69 according to the following equations. Here, it is assumed that an axis A is taken in the U-phase direction and an axis B is lagged from axis A by 90°.

$$IA=IU-(IV+IW)/2$$

$$IB=(IV-IW) \times \sqrt{3/2}$$

Phase computing circuit 74 detects a phase angle TH of phase voltage VU of AC power source 1 based on two-phase signals VA and VB outputted from three-phase to two-phase converter 58 according to the following equations.

When VB is negative and VB is smaller than—(an absolute value of VA):

$$TH=\tan^{-1} (-VA/VB)+270°$$

When VB is positive and VA is larger than (an absolute value of VB):

$TH=\tan^{-1}(VB/VA)$

When VB is negative and VA is larger than (an absolute value of VB):

$TH=\tan^{-1}(VB/VA)+360°$

When VB is positive and VB is larger than (an absolute value of VA):

$TH=\tan^{-1}(-VA/VB)+90°$

When VA is negative and VA is smaller than—(an absolute value of VB):

$TH=\tan^{-1}(VB/VA)+180°$

Coordinate transformation circuit 70 converts two-phase signals IA and IB into signals Id, Iq in a coordinate determined by the phase voltage vector of AC power source 1 using phase angle TH computed by phase computing circuit 74 according to the following equations.

$Id=IA\times\cos(TH)+IB\times\sin(TH)$ $Iq=-IA\times\sin(TH)+IB\times\cos(TH)$

According to the above transformation equations, Id becomes reactive current detected value 66 and Iq becomes active current detected value 67. Current control circuit 59 inputs reactive current command value 72, active current command value 73, reactive current detected value 66 and active current detected value 67, and outputs signals Vd and Vq for the current control. Signals Vd and Vq are able to instantaneously follow to the change in AC power source 1.

Here, this invention is characterized in that output voltages of converter 4,5 are controlled by reactive current detected value Id and active current detected value Iq computed based on phase angle TH detected by the instantaneous phase detecting means.

Coordinate transformation circuit 71 converts signals Vd and Vq into two-phase signals VA', VB' in a static coordinate system using phase angle TH computed by phase computing circuit 74 according to the following equations.

$VA'=Vd\times\cos(-TH)+Vq\times\sin(-TH)$ $VB'=-Vd\times\sin(-TH)+Vq\times\cos(-TH)$

(6) and (7) are waveforms of two-phase signals VA' and VB', respectively.

Two-phase to polar coordinate transformation circuit 61 converts signals VA' and VB' into an amplitude signal RA and a phase angle signal TH'. As for phase angle signal TH', it can be obtained by the same means for obtaining phase angle TH as described above. As for amplitude signal RA, it is obtained according to the following equation.

$RA=(VA'^2+VB'^2)^{1/2}$

(8) is amplitude signal RA outputted from two-phase to polar coordinate transformation circuit 61.

Triangular wave generator 62 converts phase angle signal TH' into a triangular wave signal TRI according to the following equations.

$THC=TH'-270°+n\times360°$

Here, n is integer which satisfies the equation ($0\leq THC\leq 360°$).

When THC is larger than 0° and smaller than 180°:

$TRI=|1-THC/90°|$

When THC is larger than 180° and smaller than 360°:

$TRI=|-3+THC/90°|$

(9) is triangular wave signal TRI outputted from triangular wave generator 62.

(10) is UV-phase voltage of converter 4,5, and (11) is U-phase current of AC power source 1. These are explained later in detail with reference to FIG. 3.

Next, with reference to FIG. 3, the operation of the control system shown in FIG. 1 is described from two-phase to polar coordinate transformation circuit 61 and triangular wave generator 62 through converter 4,5. In FIG. 3, (12) is U-phase output voltage of converter 4. In cross point detector 63, output signal (9) of triangular wave generator 62 is compared with amplitude output signal (8) of two-phase to polar coordinate transformation circuit 61. While phase angle THC is in the range of 0°–180°, when signal (8) is larger than signal (9), GTO 8 and GTO 15 in converter 4 are in the ON state and a positive DC voltage is applied to a secondary U-phase winding of transformer 2. When it is detected that signal (8) becomes smaller than signal (9), GTO 8 is turned OFF and GTO 14 is turned ON, and then the voltage applied to the secondary U-phase winding of transformer 2 becomes zero.

Next, while phase angle THC is in the range of 180°–360°, when signal (8) becomes larger than signal (9), GTO 15 is turned OFF and GTO 9 is turned ON, and thereby a negative DC voltage is applied to the secondary U-phase winding of transformer 2. When it is detected that signal (8) becomes smaller than signal (9), GTO 14 is turned OFF and GTO 8 is turned ON, and then the voltage applied to the secondary U-phase winding of transformer 2 becomes zero. Then, GTOs 8, 9, 14 and 15 are ON-OFF controlled the same as described above, the waveform of the voltage at the secondary U-phase winding of transformer 2 becomes as shown in (12).

The description of waveforms (13), (14), (15), (16), (17) and (10) are omitted as they are the same as those of the conventional control system explained using FIG. 11.

(18) is UV-phase voltage of AC power source 1. U-phase current (11) flows which is determined by the relation of the difference between UV-phase converter voltage (10) and UV-phase power source voltage (18) and the impedances of transformers 2 and 3.

FIG. 4 is a waveform diagram showing the relation among voltages of AC power source 1, voltages of converters 4 and 5, and currents flowing in AC power source 1.

In FIG. 4, (18) is UV-phase power source voltage, (20) is VW-phase power source voltage, and (22) is WU-phase power source voltage. (10) is UV-phase converter voltage, (19) is VW-phase converter voltage, and (21) is WU-phase converter voltage. Further, (11) is U-phase current, (23) is V-phase current, and (24) is W-phase current.

If at time t1, two lines of the U-phase and V-phase are grounded, thereby U-phase voltage and V-phase voltage become zero. After time t1, UV-phase power source voltage (18) becomes zero, and V-phase power source voltage (20) and WU-phase power source voltage (22) become the voltages whose amplitudes are $1/\sqrt{3}$ times those before time t1, respectively.

Output voltages (10), (19) and (21) of converters 4 and 5 can follow the sudden change of these voltages, and U-phase current (11) V-phase current (23) and W-phase current (24)

are not practically affected by the sudden change, and do not become in the overcurrent state, respectively. Accordingly, even in this two-line-to-ground fault, it is possible to continue the operation of the conversion system according to this embodiment.

In an unstable system condition, such as in the system condition that the short circuit capacity is small (the inductance component is large), due to the harmonics generated from the converter a distortion appears considerably in the voltage (the primary side voltage of the transformer) which is used for detecting a phase angle. Accordingly, if the phase angle is computed from the distorted voltage, the phase angle is affected by the harmonics thereby to give the adverse effect to the control of the converter. In order to avoid this adverse effect, a following embodiment is provided.

Figure 5:
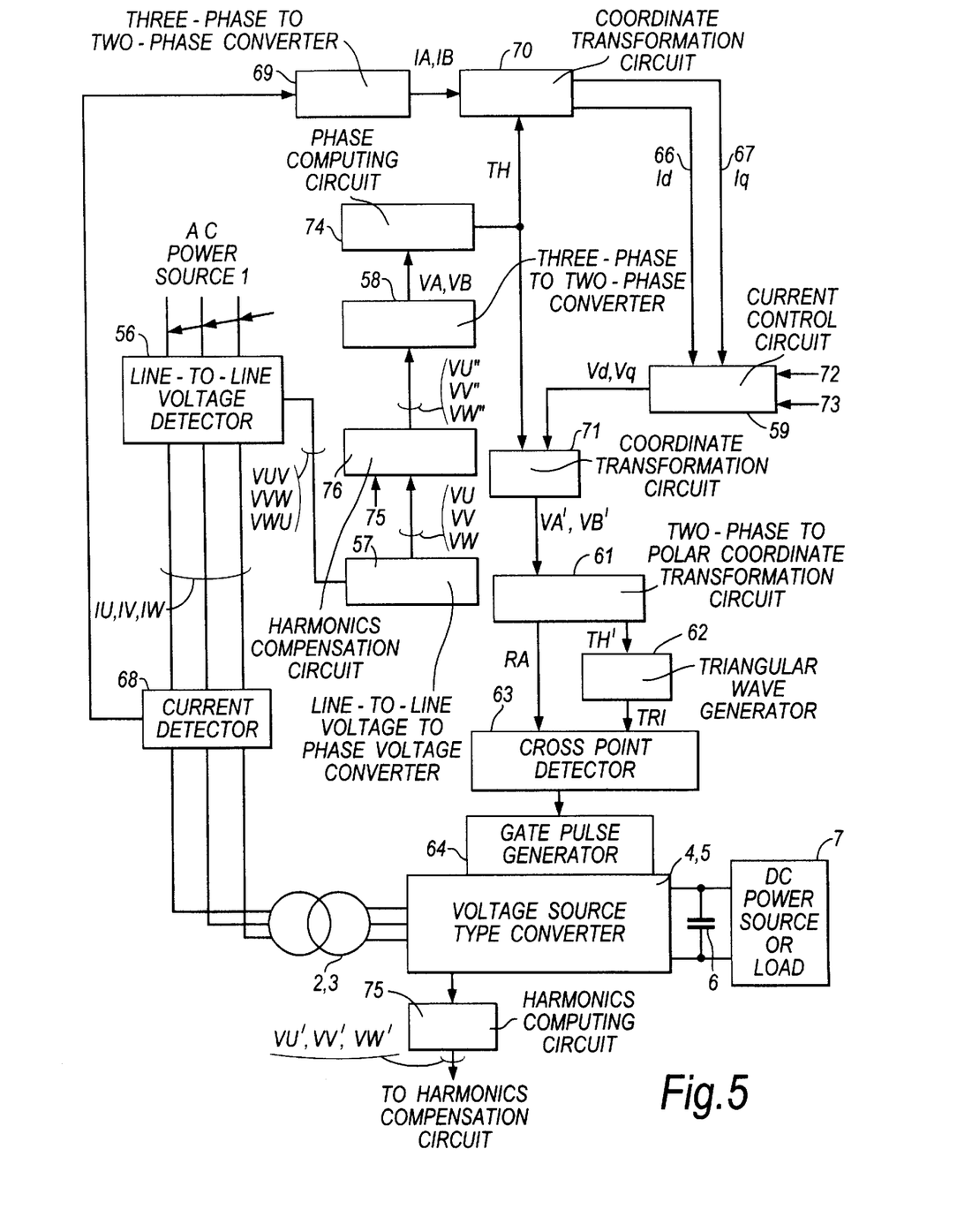
FIG. 5 is a block diagram showing the construction of a control system for a power conversion system according to a second embodiment of this invention.

FIG. 5 is a block diagram showing the construction of a control system for a power conversion system according to a second embodiment of this invention.

In FIG. 5, instead of phase locked loop 65 in FIG. 9, there is provided an instantaneous phase detecting means composed of line-to-line voltage to phase voltage converter 57, a harmonics compensation circuit 76, three-phase to two-phase converter 58 and phase computing circuit 74. Line-to-line voltage to phase voltage converter 57 converts line-to-line voltages detected by line-to-line voltage detector 56 into phase voltages of the three-phase. Harmonics compensation circuit 76 suppresses harmonics included in the phase voltages outputted from line-to-line voltage to phase voltage converter 57. Three-phase to two-phase converter 58 converts three-phase phase voltages outputted from harmonics compensation circuit 76 into two-phase signals. Phase computing circuit 74 computes a phase of a phase voltage of AC power source 1 from the two-phase signals outputted from three-phase to two-phase converter 58. The phase computed in phase computing circuit 74 is applied to coordinate transformation circuits 70 and 71.

The circuit construction from coordinate transformation circuit 70 to gate pulse generator 64 is the same as that shown in FIG. 9.

In this embodiment, there is further provided a harmonics computing circuit 75. As a means for computing harmonic voltages generated from converters 4,5, harmonics computing circuit 75 computes output voltages generated from converter 4,5 based on the DC voltage and switching signals for GTOs. The output signal of harmonics computing circuit 75 is applied to harmonics compensation circuit 76 as its input value.

Figure 6:
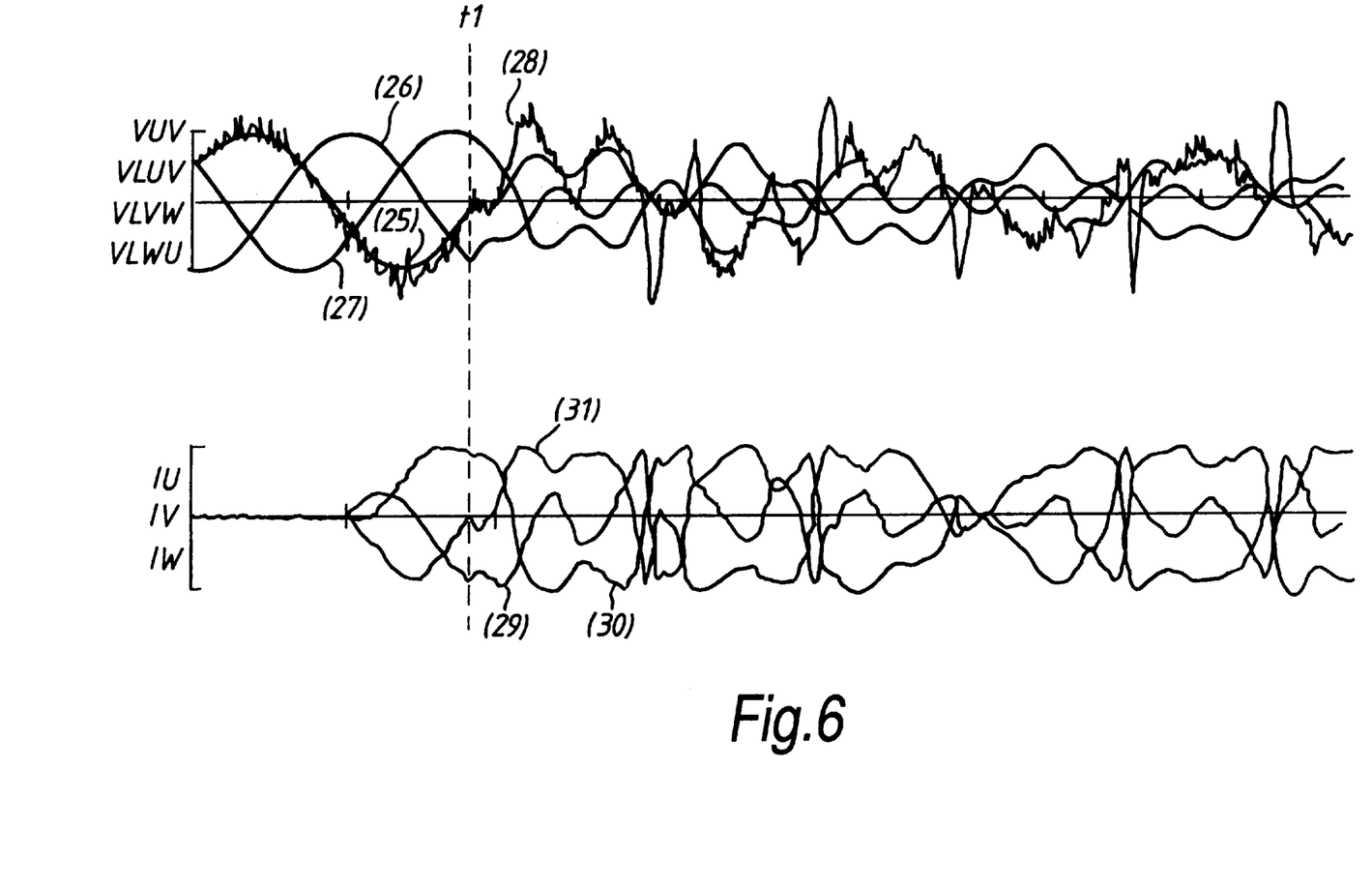
FIG. 6 is a waveform diagram for explaining the operation of the control system shown in FIG. 5.

FIG. 6 is a waveform diagram for explaining the operation of the control system shown in FIG. 5. In FIG. 6, in order to show the effect of the harmonics compensation according to this embodiment easily to understand, the waveforms in the severe system condition are shown. Accordingly, the waveforms shown in FIG. 6 are different in the system condition and fault points from the waveforms in the conventional control system shown in FIG. 9 and in the first embodiment shown in FIG. 1.

In FIG. 6, (25) is a UV-phase line-to-line voltage of AC power source 1, (26) is a VW-phase line-to-line voltage of AC power source 1, and (27) is a WU-phase line-to-line voltage of AC power source 1. Further, (28) is a UV-phase line-to-line voltage at the transformer secondary side (converter side).

It is assumed that at time t1, two lines of the V-phase and W-phase are grounded. After time t1, VW-phase line-to-line voltage (26) decreases greatly, and UV-phase line-to-line voltage (28) of transformer secondary side becomes in the oscillated state.

Line-to-line voltage detector 56 detects UV-phase line-to-line voltage (25), VW-phase line-to-line voltage (26), and WU-phase line-to-line voltage (27) of AC power source 1 and reference numerals VUV, VVW and VWU are assigned to the detected voltages, respectively. Line-to-line voltage to phase voltage converter 57 performs the following equations and outputs phase voltages VU, VV, and VW.

$$VU=(2\times VUV+VVW)/3$$

$$VV=(2\times VVW+VWU)/3$$

$$VW=(2\times VWU+VUV)/3$$

Harmonics computing circuit 75 computes voltages VU', VV' and VW' generated from converter 4,5 based on the switching state of GTOs in converter 4,5 and a value of DC voltage VDC.

For example, as for the U-phase in converter 5 shown in FIG. 8, voltage VU' is obtained according to the following equations.

When GTO 8 and GTO 15 are in the ON state:

$$VU'=VDC\times 1$$

When GTO 9 and GTO 14 are in the ON state:

$$VU'=VDC\times(-1)$$

When all the GTOs are in the OFF state:

$$VU'=0$$

Harmonics compensation circuit 76 performs the harmonics compensation computation using an impedance XL of AC power source 1 and an impedance XT of transformer 2,3 as described in the following equations. Here, so as to compensate the harmonics generated by converter 4,5, it performs such a computation as to reduce a gain of the positive feedback loop for generating further larger harmonic voltages in converter 4,5.

$$VU''=[VU\times(XT+XL)-VU'\times XL]/XT$$

$$VV''=[VV\times(XT+XL)-VV'\times XL]/XT$$

$$VW''=[VW\times(XT+XL)-VW'\times XL]/XT$$

Further, harmonics compensated phase voltages VU", VV" and VW" are converted to two-phase signals VA and VB in an orthogonal AB coordinate in three-phase to two-phase converter 58 according to the following equations. Here, it is assumed that an axis A is taken in the U-phase direction and an axis B is advanced from axis A by 90°.

$$VA=VU''-(VV''+VW'')/2$$

$$VB=(VV''-VW'')\times\sqrt{3}/2$$

Current detector 68 detects phase currents IU, IV and IW outputted from converter 4,5. Further, phase currents IU, IV and IW are converted to two-phase signals IA and IB in an orthogonal AB coordinate in three-phase to two-phase converter 69 according to the following equations. Here, it is assumed that an axis A is taken in the U-phase direction and an axis B is advanced from axis A by 90°.

$$IA=IU-(IV+IW)/2$$

$$IB=IV-(IV-IW)\times\sqrt{3}/2$$

Phase computing circuit 74 detects phase angle TH of phase voltage VU of AC power source 1 based on two-phase signals VA and VB outputted from three-phase to two-phase converter 58 according to the following equations.

When VB is negative and VB is smaller than—(an absolute value of VA):

$$TH=\tan^{-1}(-VA/VB)+270°$$

When VB is positive and VA is larger than (an absolute value of VB):

$$TH=\tan^{-1}(VB/VA)$$

When VB is negative and VA is larger than (an absolute value of VB):

$$TH=\tan^{-1}(VB/VA)+360°$$

When VB is positive and VB is larger than (an absolute value of VA):

$$TH=\tan^{-1}(-VA/VB)+90°$$

When VA is negative and VA is smaller than—(an absolute value of VB):

$$TH=\tan^{-1}(VB/VA)+180°$$

Coordinate transformation circuit 70 converts two-phase signals IA and IB into signals Id, Iq in a coordinate determined by the phase voltage vector of AC power source 1 using phase angle TH computed by phase computing circuit 74 according to the following equations.

$$Id=IA\times\cos(TH)+IB\times\sin(TH)$$

$$Iq=-IA\times\sin(TH)+IB\times\cos(TH)$$

According to the above transformation equations, Id becomes reactive current detected value 66 and Iq becomes active current detected value 67. Current control circuit 59 inputs reactive current command value 72, active current command value 73, reactive current detected value 66 and active current detected value 67, and outputs signals Vd and Vq for the current control. Signals Vd and Vq are able to instantaneously follow to the change in AC power source 1.

Coordinate transformation circuit 71 converts signals Vd and Vq into two-phase signals VA', VB' in a static coordinate system using phase angle TH computed by phase computing circuit 74 according to the following equations.

$$VA'=Vd\times\cos(-TH)+Vq\times\sin(-TH)$$

$$VB'=-Vd\times\sin(-TH)+Vq\times\cos(-TH)$$

Two-phase to polar coordinate transformation circuit 61 converts signals VA' and VB' into amplitude signal RA and phase angle signal TH'. As for phase angle signal TH', it can be obtained by the same means for obtaining phase angle TH as described above. As for amplitude signal RA, it is obtained according to the following equation.

$$RA=(VA'^2+VB'^2)^{1/2}$$

Triangular wave generator 62 converts phase angle signal TH' into triangular wave signal TRI according to the following equations.

$$THC=TH'-270°+n\times 360°$$

Here, n is an integer which satisfies the equation ($0\leq THC\leq 360°$).

When THC is larger than 0° and smaller than 180°:

$$TRI=|1-THC/90°|$$

When THC is larger than 180° and smaller than 360°:

$$TRI=|-3+THC/90°|$$

Next, the operation of the control system shown in FIG. 5 is described from two-phase to polar coordinate transformation circuit 61 and triangular wave generator 62 through converter 4,5.

In cross point detector 63, the output signal of triangular wave generator 62 is compared with the amplitude output of two-phase to polar coordinate transformation circuit 61. While phase angle THC is in the range of 0°–180°, when the amplitude output is larger than the output signal of triangular wave generator 62, GTO 8 and GTO 15 in converter 4 are in the ON state and a positive DC voltage is applied to a secondary U-phase winding of transformer 2. When it is detected that the amplitude output becomes smaller than the output signal of triangular wave generator 62, GTO 8 is turned OFF and GTO 14 is turned ON, and then the voltage applied to the secondary U-phase winding of transformer 2 becomes zero.

Next, while phase angle THC is in the range of 180°–360°, when the amplitude output becomes larger than the output signal of triangular wave generator 62, GTO 15 is turned OFF and GTO 9 is turned ON, and thereby a negative DC voltage is applied to the secondary U-phase winding of transformer 2. When it is detected that the amplitude output becomes smaller than the output signal of triangular wave generator 62, GTO 14 is turned OFF and GTO 8 is turned ON, and then the voltage applied to the secondary U-phase winding of transformer 2 becomes zero. Then, GTOs 8, 9, 14 and 15 are ON-OFF controlled the same as described above, and the voltage as described above is generated at the secondary U-phase winding of transformer 2.

FIG. 6 is a waveform diagram showing the relation among voltages of AC power source 1, voltages of converters 4 and 5, and currents flowing in AC power source 1 in this second embodiment in which harmonics compensation is performed. In contrast to FIG. 6, FIG. 7 is a waveform diagram showing the relation among voltages of AC power source 1, voltages of converters 4 and 5, and currents flowing in AC power source 1 in the first embodiment shown in FIG. 1 in which harmonics compensation is not performed.

Figure 7:
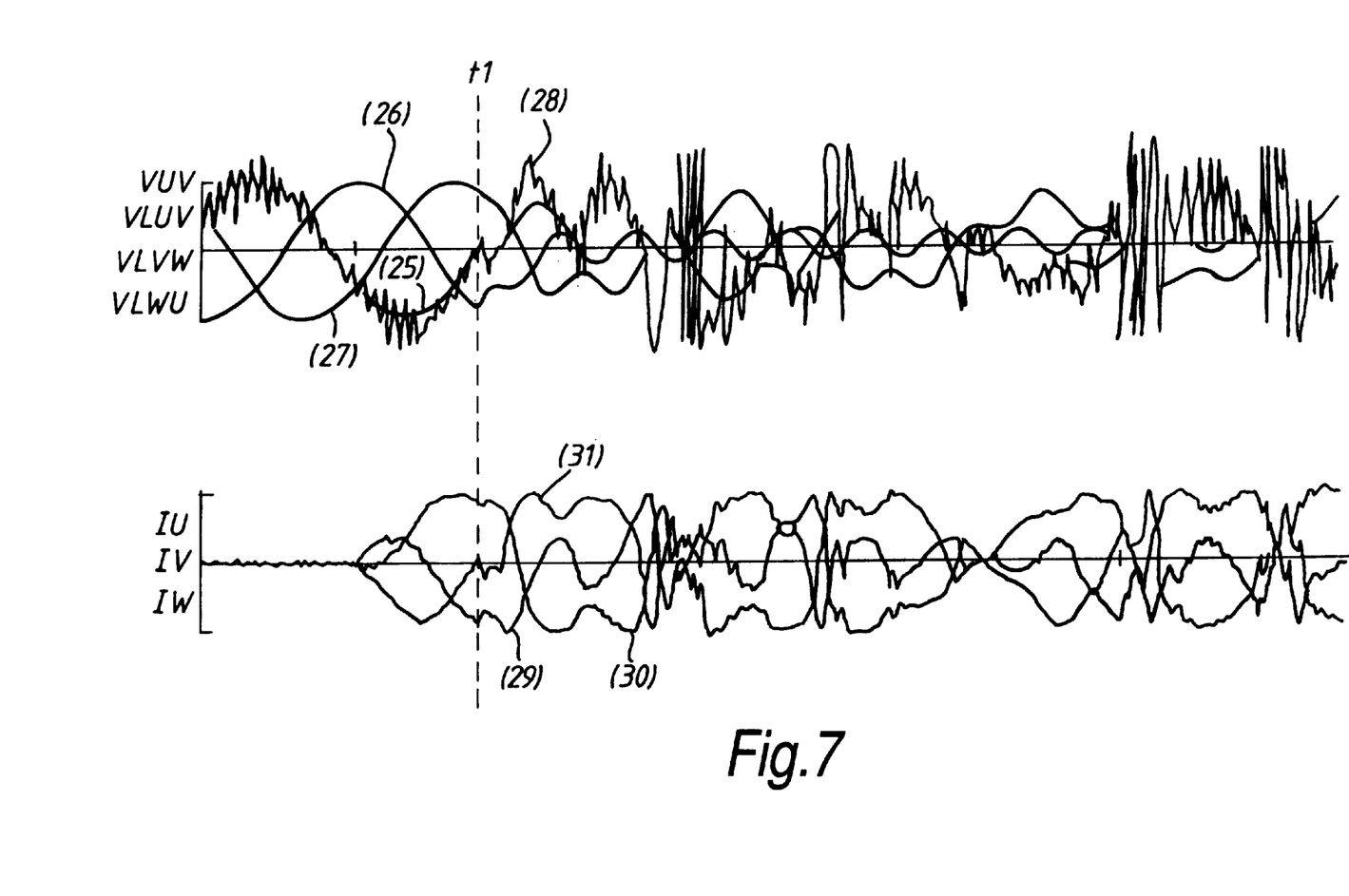
FIG. 7 is a waveform diagram for explaining the operation of the control system shown in FIG. 1.

In both FIGS. 6 and 7, (25) is UV-phase power source voltage, (26) is VW-phase power source voltage, (27) is WU-phase power source voltage, and (28) is UV-phase converter voltage. Further, (29) is U-phase current, (30) is V-phase current, and (31) is W-phase current, If at time t1, two lines of the V-phase and W-phase are grounded, VW-phase power source voltage (26) decreases greatly. After time t1, output voltage (28) of converter 4,5 can follow the sudden change of VW-phase power source voltage (26), and U-phase current (29), V-phase current (30) and W-phase current (31) are not practically affected by the sudden change, and do not become in the overcurrent state, respectively. Accordingly, even in this earth fault, it is possible to continue the operation of the power conversion system according to both embodiments.

In comparison with FIG. 6 and FIG. 7, it can be found that the harmonics in UV-phase converter voltage (28), U-phase current (29), V-phase current (30), and W-phase current (31) are suppressed more in the second embodiment in which harmonics compensation is performed than in the first embodiment in which harmonics compensation is not performed.

This invention is not limited to a control system for a power conversion system shown in FIG. 8. This invention can be applied to a multiple power conversion system different from that shown in FIG. 8. Furthermore, this invention is also applied to a non-multiple power conversion system composed of a single power converter.

According to this invention, it is possible to provide a control system for a power conversion system which can continue the operation of the power conversion system, even if a fault, such as an earth fault, occurs in an AC power system and the voltage waveforms of the AC power system is greatly distorted, without generating overcurrents by detecting instantaneously a phase angle of a voltage of the AC power system. In particular, when this invention is applied to a system in which a very large loss is generated if the operation of the power conversion system is stopped, a very large effect is expected.

In addition to the above-described effect, according to this invention, it is possible to provide a control system for a power conversion system which can suppress harmonics generated from the power conversion system in an unstable system condition, such as in the system condition that the short circuit capacity is small, and thereby can prevent the control due to the change in the detected phase caused by the harmonics.

Obviously, numerous modifications and variations of the present invention are possible in light of the above teachings it is therefore to be understood that within the scope of the appended claims, the invention may be practiced otherwise than as specifically described herein.

What is claimed is:

1. A control system for a power conversion system composed of at least one voltage source type converter and a transformer, said voltage source type converter composed of a plurality of bridge connected self-turn-off devices for converting DC power into AC power, AC sides of said voltage source type converter connected to secondary windings of said transformer, and primary windings of said transformer adapted for connecting to an AC power source, said control system comprising:

means for detecting line-to-line voltages of said AC power source;

instantaneous phase detecting means for detecting instantaneously a phase angle of a phase voltage of said AC power source based on said line-to-line voltages of said AC power source;

means for detecting AC currents outputted from said power conversion system;

first coordinate transformation means connected to receive said phase angle and said AC currents for converting said AC currents into an active current detected value and a reactive current detected value in a coordinate determined by a phase voltage vector of said AC power source using said phase angle;

current control means connected to receive said active current detected value, said reactive current detective value, an active current command value and a reactive current command value for generating output signals based on a current control result;

second coordinate transformation means connected to receive said phase angle and said output signals of said current control means for converting said output signals into two-phase signals in a static coordinate system using said phase angle;

pulse width modulation control means connected to receive said two-phase signals for generating pulse width modulated signals, based on a pulse width modulation control result; and means for generating gate pulses for turning ON or OFF one of said self-turn-off devices in said voltage source type converter, respectively, based on said pulse width modulated signals.

2. The control system for a power conversion system according to claim 1, wherein said instantaneous phase detecting means includes:

means for converting said line-to-line voltages of said AC power source into three-phase phase voltages of said AC power source;

means for converting said three-phase phase voltages of said AC power source into two-phase voltage signals; and means for computing said phase angle of said phase voltage of said AC power source based on said two-phase voltage signals.

3. The control system for a power conversion system according to claim 1, further comprising:

harmonics computing means for computing output voltages of said power conversion system based on DC voltage of said power conversion system and switching state of said gate-turn-off devices;

wherein said instantaneous phase detecting means includes, means for converting said line-to-line voltages of said AC power source into three-phase phase voltages of said AC power source;

harmonics compensation means connected to receive said three-phase phase voltages and said computed output voltages of said power conversion system for suppressing harmonics included in said three-phase phase voltages based on said computed output voltages to generate three-phase harmonics compensated phase voltages of said AC power source;

means for converting said three-phase harmonics compensated phase voltages of said AC power source into two-phase voltage signals; and means for computing said phase angle of said phase voltage of said AC power source based on said two-phase voltage signals.

* * * * *